United States Patent
Fu

(10) Patent No.: US 10,198,247 B2
(45) Date of Patent: Feb. 5, 2019

(54) METHOD, DEVICE AND SYSTEM FOR VOICE INTERACTION

(71) Applicant: ZTE CORPORATION, Shenzhen, Guangdong Province (CN)

(72) Inventor: Hongfeng Fu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/514,423

(22) PCT Filed: Apr. 7, 2015

(86) PCT No.: PCT/CN2015/075999
§ 371 (c)(1),
(2) Date: Mar. 24, 2017

(87) PCT Pub. No.: WO2016/045348
PCT Pub. Date: Mar. 31, 2016

(65) Prior Publication Data
US 2017/0300295 A1    Oct. 19, 2017

(30) Foreign Application Priority Data
Sep. 25, 2014    (CN) .......................... 2014 1 0499822

(51) Int. Cl.
G06F 3/16 (2006.01)
G06F 13/42 (2006.01)
G06F 13/38 (2006.01)

(52) U.S. Cl.
CPC ............ *G06F 3/167* (2013.01); *G06F 13/385* (2013.01); *G06F 13/4282* (2013.01)

(58) Field of Classification Search
None
See application file for complete search history.

(56) References Cited

U.S. PATENT DOCUMENTS

2013/0217274 A1*   8/2013   Bar-Niv ................. H01R 27/02
                                                                 439/676

FOREIGN PATENT DOCUMENTS

| CN | 101739374 | 6/2010 |
|----|-----------|--------|
| CN | 102611544 | 7/2012 |
| CN | 203520391 | 4/2014 |
| EP | 2375340   | 10/2011 |
| EP | 2711843   | 3/2014 |
| EP | 2765571   | 8/2014 |
| WO | WO 2009/118582 | 10/2009 |
| WO | WO 2010/045363 | 4/2010 |
| WO | WO 2011/038211 | 3/2011 |

OTHER PUBLICATIONS

International Search Report, International application No. PCT/CN2015/075999, dated Jul. 1, 2015.
European Search Report for Application No. EP 15843374 dated Jul. 17, 2017.

* cited by examiner

*Primary Examiner* — Farley Abad
*Assistant Examiner* — Dayton Lewis-Taylor

(57) ABSTRACT

The disclosure discloses a method, device and system for voice interaction, the method including: determining that an external device adopts Universal Serial Bus (USB) 2.0 standard for transmission and the external device supports a voice function; and conducting voice interaction with the external device by adopting customized MIC lines and SPK lines in a micro USB3.0-B female connector interface.

11 Claims, 4 Drawing Sheets

METHOD, DEVICE AND SYSTEM FOR VOICE INTERACTION

TECHNICAL FIELD

The disclosure relates to the field of communications, and in particular to a method, device and system for voice interaction.

BACKGROUND

At present, as more and more users gradually have increasing demands and dependence on mobile terminals with portability, mobile terminal products on a market have been greatly promoted and popularized. However, in the related art, a universal serial bus (USB) interface used on the mobile terminals is typically a USB2.0 interface (mini USB or micro USB).

However, using the USB2.0 interface on portable mobile terminal products has the following drawbacks:

drawback 1: the USB2.0 interface provides lower power (typically 2.5 W). When a portable mobile terminal requires higher power, an interface will be unable to provide the portable mobile terminal with sufficient power supply input capacity, thus easily causing a phenomenon that a system abnormally powers off and shuts down or restarts due to undervoltage or undercurrent.

drawback 2: the USB2.0 interface provides a lower transmission rate (theoretical value being 480 Mbps). When the portable mobile terminal requires a higher transmission rate, which is beyond the above rate, the interface will be unable to bear.

drawback 3: the USB2.0 interface only has five lines, that is, two power supply lines, two data lines and one identification (ID) line, which can only realize a standard USB2.0 protocol. When expanding functions on a bus besides USB is considered, USB2.0 will be unable to realize it.

It can be seen that in the related art, the USB2.0 interface used on terminal products can not satisfy requirements of high power and high transmission rate, and expandability is poor.

SUMMARY

Embodiments of the disclosure provide a method, device and system for voice interaction so as at least to solve problems that in the related art, USB 2.0 interface used on terminal products can not satisfy requirements of high power and high transmission rate and expandability is poor.

A method for voice interaction is provided according to an embodiment of the disclosure.

determining that an external device adopts Universal Serial Bus (USB)2.0 standard for transmission and the external device supports a voice function; and conducting voice interaction with the external device by adopting customized MIC lines and SPK lines in a micro USB3.0-B female connector interface.

In an example embodiment, before conducting the voice interaction with the external device by adopting the MIC lines and the SPK lines, the method further comprises: comparing the micro USB3.0-B female connector interface with an USB2.0 interface to determine a first pair of differential signal lines and a second pair of differential signal lines; and configuring the first pair of differential signal lines as the MIC lines and configuring the second pair of differential signal lines as the SPK lines.

In an example embodiment, configuring the first pair of differential signal lines as the MIC lines and configuring the second pair of differential signal lines as the SPK lines comprises: configuring a MicB_SSTX− line and a MicB_SSTX+ line among the signal lines of the micro USB3.0-B female connector interface as the MIC lines; and configuring a MicB_SSRX− line and a MicB_SSRX+ line among the signal lines as the SPK lines.

In an example embodiment, conducting the voice interaction with the external device by adopting the MIC lines and the SPK lines comprises: conducting the voice interaction with the external device by adopting MIC lines and SPK lines via a USB shielding line which converts a USB3.0-A interface into a micro USB3.0-B male connector interface, wherein after generating a to-be-sent analogue voice signal through a processing of digital-to-analogue conversion, data voice information to be sent to the external device is sent to the external device via the USB shielding line, and/or, after a processing of analogue-to-digital conversion, an analogue voice signal received from the external device via the USB shielding line generates a to-be-received digital voice signal.

In an example embodiment, the method is applied to a mobile terminal and the external device is an on-board system.

A device for voice interaction is provided according to another embodiment of the disclosure.

The device for voice interaction according to another embodiment of the disclosure includes: a micro USB3.0-B female connector interface, arranged to determine that an external device adopts USB2.0 standard for transmission and the external device supports voice function; and conduct voice interaction with the external device by adopting customized MIC lines and SPK lines.

In an example embodiment, the micro USB3.0-B female connector interface is further arranged to: compare the micro USB3.0-B female connector interface with an USB2.0 interface to determine a first pair of differential signal lines and a second pair of differential signal lines, and configure the first pair of differential signal lines as the MIC lines and configure the second pair of differential signal lines as the SPK lines to conduct the voice interaction with the external device.

In an example embodiment, the micro USB 3.0-B female connector interface 10 is further arranged to configure a MicB_SSTX− line and a MicB_SSTX+ line as the MIC lines, and configure a MicB_SSRX− line and a MicB_SSRX+ line in the wire cable as the SPK lines.

In an example embodiment, the micro USB3.0-B female connector interface is further arranged to conduct the voice interaction with the external device by adopting the MIC lines and the SPK lines via a USB shielding line which converts a USB3.0-A interface into a micro USB3.0-B male connector interface, wherein after generating a to-be-sent analogue voice signal through a processing of digital-to-analogue conversion, data voice information to be sent to the external device is sent to the external device via the USB shielding line, and/or, after a processing of analogue-to-digital conversion, an analogue voice signal received from the external device via the USB shielding line generates a to-be-received digital voice signal.

In an example embodiment, the device is applied to a mobile terminal and the external device is an on-board system.

A system for voice interaction is provided according to another embodiment of the disclosure.

The system for voice interaction according to another embodiment of the disclosure includes: the above-mentioned device and a USB shielding line which converts a USB3.0-A interface into a micro USB3.0-B male connector interface.

Through the embodiments of the disclosure, by the way of determining that an external device adopts USB2.0 standard for transmission and the external device supports a voice function, and by the way of conducting voice interaction with the external device by adopting customized MIC lines and SPK lines in a micro USB 3.0-B female connector interface, the problems that in the related art, the USB2.0 interface used on terminal products cannot satisfy the requirements of high power and high transmission rate and the expandability is poor are solved. Furthermore, functions of a portable mobile device are expanded and user experience is improved.

BRIEF DESCRIPTION OF THE DRAWINGS

The drawings described here are intended to provide further understanding of the disclosure and constitute a part of the application. The exemplary embodiments of the disclosure and description thereof are intended to explain the disclosure and do not unduly limit the disclosure. In the drawings.

DETAILED DESCRIPTION

Hereinafter, the disclosure will be described in detail with reference to the drawings and in combination with the embodiments. It needs to be further explained that in a case of no conflict, the embodiments in the application and features in the embodiments can be combined with each other.

Figure 1:
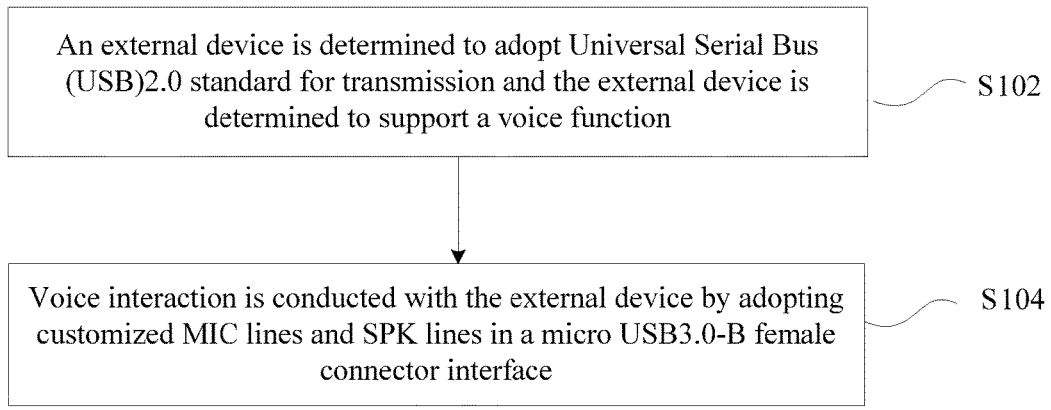
FIG. 1 shows a flowchart of a method for voice interaction according to an embodiment of the disclosure.

FIG. 1 shows a flowchart of a method for voice interaction according to an embodiment of the disclosure. As shown in FIG. 1, the method can include the following processing steps:

Step102: an external device is determined to adopt Universal Serial Bus (USB)2.0 standard for transmission and the external device is determined to support a voice function; and Step104: voice interaction is conducted with the external device by adopting customized MIC lines and SPK lines in a micro USB3.0-B female connector interface.

In the related art, a USB2.0 interface used on a terminal product can not satisfy the requirements of high power and high transmission rate, and the expandability is poor. Applying the method shown in FIG. 1 can make a portable mobile terminal product obtain a greater power supply input capacity (the latest standard of micro USB3.0-B supports 100 W and the common one is 10 W) after supporting the external device with a USB3.0 interface in connection, thus being able to provide higher power for the portable mobile terminal to ensure a stable work of the portable mobile terminal; can make the portable mobile terminal product obtain a higher transmission rate (the theoretical value thereof can reach 5.0 Gbps) after supporting the external device with the USB3.0 interface in connection, thus being able to provide a higher transmission rate for the portable mobile terminal; and can make the portable mobile terminal product adopts two more pairs of differential signal lines of a micro USB3.0 interface than that of a USB2.0 standard bus to customize a group of MIC lines and SPK lines after supporting the external device with the USB3.0 interface in connection, thus providing dual functions of outputting voice and data for the portable mobile terminal. In this way, the problems that in the related art, the USB2.0 interface used on terminal products can not satisfy the requirements of high power and high transmission rate and the expandability is poor are solved. Furthermore, the mobile terminal can be provided with a greater power supply input capacity, a higher transmission rate and more expansion functions.

During the implementation of the example embodiments, the above method can be applied to a mobile terminal and the external device can be an on-board system.

In an example embodiment, in Step 104, before conducting the voice interaction with the external device by adopting MIC lines and SPK lines, the following operations can be further included:

Step 1: the micro USB3.0-B female connector interface is compared with an USB2.0 interface to determine a first pair of differential signal lines and a second pair of differential signal lines; and Step 2: the first pair of differential signal lines is configured as the MIC lines and the second pair of differential signal lines is configured as the SPK lines to conduct the voice interaction with the external device.

Namely, adopting two more pairs of differential signal lines among nine lines provided by the USB3.0 interface than that of USB2.0 standard bus (only having five lines, namely, two power supply lines, two data lines and one identification (ID) line) to customize a group of MIC lines and SPK lines, thus providing dual functions of outputting voice and data for the portable mobile terminal.

In an example embodiment, in the above Step 2, a MicB_SSTX− line and a MicB_SSTX+ line among the signal lines of the micro USB3.0-B female connector interface can be configured as the MIC lines; and a MicB_SSRX− line and a MicB_SSRX+ line among the signal lines can be configured as the SPK lines.

In an example embodiment, through a wire cable which converts a USB3.0-A male connector into a micro USB-B male connector, the portable mobile terminal is provided with greater input power, a higher transmission rate and more use functions. Meanwhile, through customizing MicB_SSTX–/Mic_SSTX+ and MicB_SSRX–/MicB_SSRX+ signal lines in USB3.0 wire cable, a USB3.0 line is made to transmit an analogue signal and D+ and D– signal lines in micro USB3.0 wire cable are used to transmit a data signal.

It needs to be explained that among the four lines—the MicB_SSTX– line, the Mic_SSTX+ line, the MicB_SSRX– line and the MicB_SSRX+ line, using which two lines as the MIC lines and using which two lines as the SPK lines can be defined randomly and freely. The above-mentioned example embodiments are only illustrative explanation and do not unduly limit the disclosure.

It needs to be explained that the data signal and the analogue signal can be transmitted at different time and can also be transmitted simultaneously. Both exist independently and do not affect each other in function.

In an example embodiment, in Step 104, the MIC lines and the SPK lines via a USB shielding line which converts a USB3.0-A interface into a micro USB3.0-B male connector interface can be adopted to conduct the voice interaction with the external device, wherein after generating a to-be-sent analogue voice signal through a processing of digital-to-analogue conversion, data voice information to be sent to the external device is sent to the external device via the USB shielding line, and/or, after a processing of analogue-to-digital conversion, an analogue voice signal received from the external device via the USB shielding line generates a to-be-received digital voice signal.

Hereinafter, the above example implementation process will be further described in combination with several specific application scenes.

Figure 2:
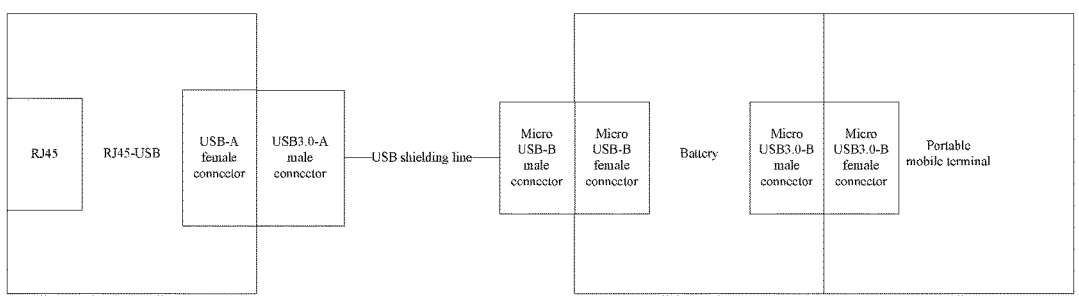
FIG. 2 shows a diagram of a terminal product connected to an application scene with a wideband interface (such as a hotel or home) through a RJ45-Universal Serial Bus (USB) component according to an example embodiment of the disclosure.

FIG. 2 shows a diagram of a terminal product connected to an application scene with a wideband interface (such as a hotel or home) through a RJ45-USB component according to an example embodiment of the disclosure. As shown in FIG. 2, data can be sent to the portable mobile terminal through a RJ45-USB component through a wideband interface, thus finishing the portable mobile terminal accessing a data transmission function of an Internet through micro USB3.0.

Figure 3A:
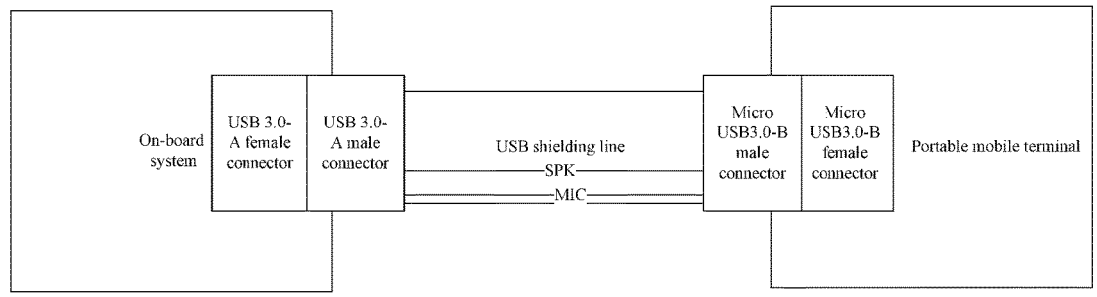
FIG. 3a shows a diagram of a terminal product connected to an on-board system through a micro USB3.0 connector according to an example embodiment of the disclosure.
Figure 3B:
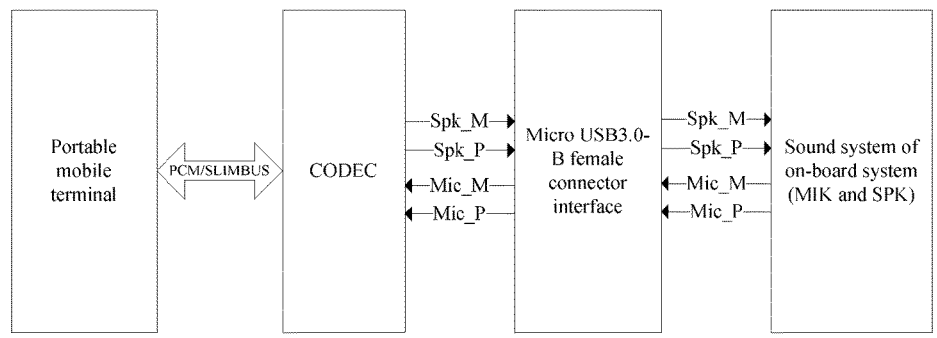
FIG. 3b shows a diagram of a terminal product conducting voice interaction with an on-board system through a micro USB3.0 connector according to an example embodiment of the disclosure.

FIG. 3a shows a diagram of a terminal product connected to an on-board system through a micro USB3.0 connector according to an example embodiment of the disclosure. FIG. 3b shows a diagram of a terminal product conducting voice interaction with an on-board system through a micro USB3.0 connector according to an example embodiment of the disclosure. As shown in FIGS. 3a and 3b, through using a difference of micro USB3.0 from USB2.0 in bus, a bus of USB2.0 continues to be used as a signal for transmitting a USB protocol and remaining signal lines are used as customized signal lines capable of transmitting the analogue voice. With a sound and microphone system of a vehicle and in combination with a voice processing function of the portable mobile terminal, a voice function of making a call on the vehicle is finished. In addition, a data type function can be finished on the vehicle through the standard USB2.0 protocol on the micro USB3.0 connector, thus realizing the portable mobile terminal accessing the data function of the Internet.

It needs to be explained that the above two functions can be conducted independently at different time, can also be conducted simultaneously, can work independently, and can cooperate with each other to realize functions.

Figure 4:
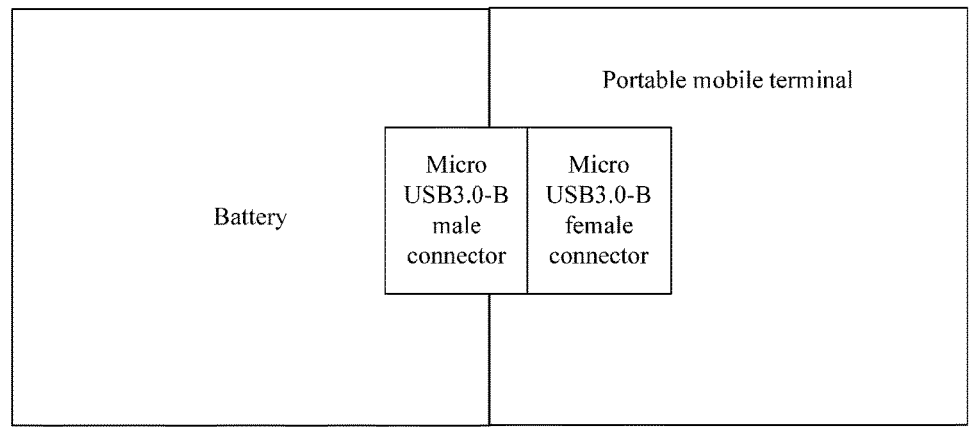
FIG. 4 shows a diagram of a terminal product connected to a battery for use through a micro USB3.0 according to an example embodiment of the disclosure.

FIG. 4 shows a diagram of a terminal product connected to a battery for use through a micro USB3.0 according to an example embodiment of the disclosure. As shown in FIG. 4, by connecting a battery equipped with a USB3.0-B male connector interface to the mobile terminal equipped with a USB3.0-B female connector interface, the mobile terminal can be supplied with power.

Figure 5:
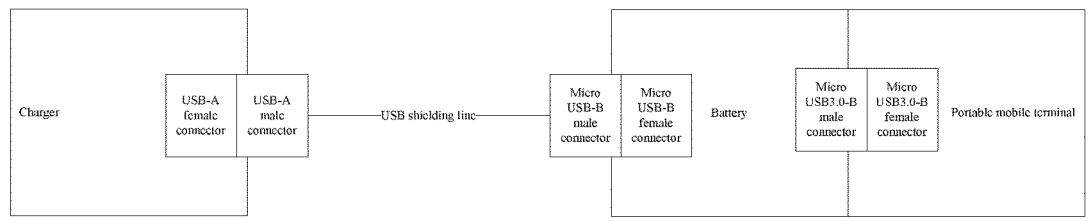
FIG. 5 shows a diagram of a terminal product connected to a charger for use through a micro USB3.0 according to an example embodiment of the disclosure.

FIG. 5 shows a diagram of a terminal product connected to a charger for use through a micro USB3.0 according to an example embodiment of the disclosure. As shown in FIG. 5, after the mobile terminal is connected to the battery equipped with the USB3.0-B male connector interface through the self-equipped USB3.0-B female connector interface, the battery then is connected with the charger equipped with the USB3.0-A interface via a USB shielding line which converts a USB-B female connector interface into a micro USB-B male connector interface via a USB3.0-A interface so as to charge the mobile terminal.

Figure 6:
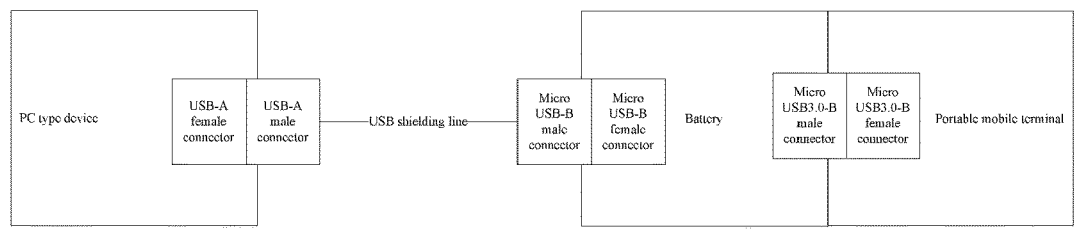
FIG. 6 shows a diagram of a terminal product connected to a PC with a USB3.0-A female connector interface for use through a micro USB3.0 according to an example embodiment of the disclosure.

FIG. 6 shows a diagram of a terminal product connected to a personal computer (PC) with a USB3.0-A female connector interface for use through a micro USB3.0 according to an example embodiment of the disclosure. As shown in FIG. 6, after the mobile terminal is connected to the battery equipped with the USB3.0-B male connector interface through the self-equipped USB3.0-B female connector interface, the battery then is connected with a PC type device equipped with the USB-A female connector interface via a USB shielding line which converts a USB-B female connector interface into a micro USB-B male connector interface via a USB3.0-A interface so as to charge the mobile terminal.

Figure 7:
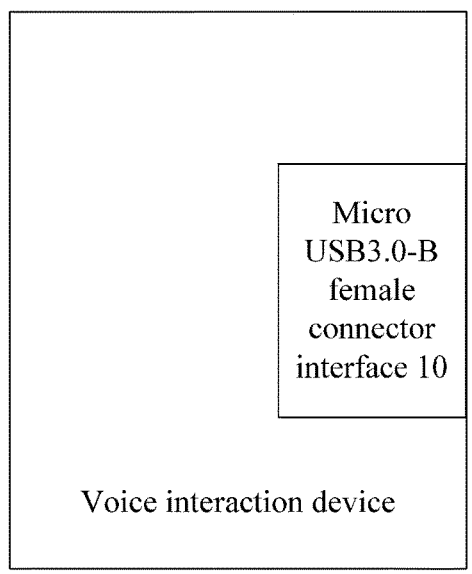
FIG. 7 shows a structural block diagram of a device for voice interaction according to an embodiment of the disclosure.

FIG. 7 shows a structural block diagram of a device for voice interaction according to an embodiment of the disclosure. As shown in FIG. 7, the device for voice interaction can include: a micro USB3.0-B female connector interface 10, arranged to determine that an external device adopts USB2.0 standard for transmission and the external device supports a voice function, and conduct voice interaction with the external device by adopting customized MIC lines and SPK lines.

With the device shown in FIG. 7, the problems that in the related art, the USB2.0 interface used on terminal products cannot satisfy the requirements of high power and high transmission rate and the expandability is poor are solved. Furthermore, functions of a portable mobile device are expanded and user experience is improved.

During the implementation of the example embodiments, the above device can be applied to a mobile terminal and the external device can be an on-board system.

In an example embodiment, the micro USB3.0-B female connector interface 10 is further arranged to compare the micro USB3.0-B female connector interface with an USB2.0 interface to determine a first pair of differential signal lines and a second pair of differential signal lines, and configure the first pair of differential signal lines as the MIC lines and configure the second pair of differential signal lines as the SPK lines to conduct the voice interaction with the external device.

In an example embodiment, the micro USB 3.0-B female connector interface 10 is further arranged to configure a MicB_SSTX– line and a MicB_SSTX+ line as the MIC lines, and configure a MicB_SSRX– line and a MicB_SSRX+ line in the wire cable as the SPK lines.

In an example embodiment, the micro USB3.0-B female connector interface 10 is further arranged to conduct the voice interaction with the external device by adopting MIC lines and SPK lines via a USB shielding line which converts a USB3.0-A interface into a micro USB3.0-B male connector interface, wherein after generating a to-be-sent analogue voice signal through a processing of digital-to-analogue conversion, data voice information to be sent to the external device is sent to the external device via the USB shielding line, and/or, after a processing of analogue-to-digital conversion, an analogue voice signal received from the external device via the USB shielding line generates a to-be-received digital voice signal.

Figure 8:
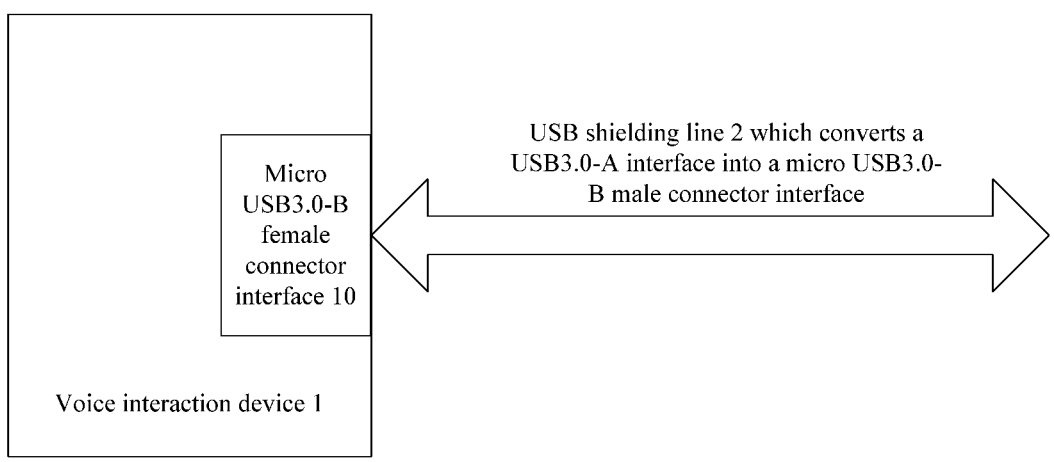
FIG. 8 shows a structural block diagram of a system for voice interaction according to an embodiment of the disclosure.

FIG. 8 shows a structural block diagram of a system for voice interaction according to an embodiment of the disclosure. As shown in FIG. 8, the system for voice interaction can include: the device for voice interaction 1 and a USB shielding line 2 which converts a USB3.0-A interface into a micro USB3.0-B male connector interface.

An example embodiment of the disclosure provides a portable mobile terminal with a micro USB3.0-B interface, and the mobile terminal can include:

(1) a detecting component: the component can consist of an overvoltage and overcurrent protection component, a micro USB3.0-B connector, a USB shielding line and a USB3.0 bus controller. After the portable mobile terminal is connected to a PC-type computer supporting a USB-A device interface through a USB interface, a connection or disconnection state of a device can be read through a pull-up resistor, and then a host determines a speed type of the device through high and low voltages of differential lines when the device is idle.

Through an overvoltage protection software and hardware component, a safety of a terminal power supply can be protected and noticed. Overvoltage protection can provide voltage protection within a certain limit (for example, 28V). When a voltage exceeds the above-mentioned limit value, the overvoltage protection component cuts off power supply output, power supply will not be provided for a succeeding component anymore, and through a signal connected to overvoltage protection status, a baseband chip or a power supply management chip obtains an overvoltage message. Thus a user is noticed through a human-machine interaction component (such as a light-emitting diode (LED), a liquid crystal display (LCD) and blocks extensible exchange protocol (BEEP)) so that the user can replace the power supply timely to avoid damaging a component.

In an example embodiment, when D+ and D− signals of an USB bus are detected to be identical, it means the D+ and D− signals are connected through short circuit, and then the mobile terminal will be identified to be connected to a socket. In addition, detecting an identification (ID) line on the USB bus can be used for identifying that currently the mobile terminal is in a host mode or device mode.

In an example embodiment, the speed type of the device can be determine through high and low voltages of the differential lines when the mobile terminal is idle, thus differentiating that an end device adopts USB2.0 standard for transmission or USB3.0 standard for transmission so that MIC lines and SPK lines can be expanded.

(2) a data communication component: the component can consists of a USB3.0 controller, a USB shielding wire cable which converts a USB3.0-A interface into a micro USB3.0-B male connector interface, and a micro USB3.0-B female connector interface. When the portable mobile terminal is identified to be connected to a low speed USB2.0 bus interface, data communication capacity of the portable mobile terminal will be realized through two lines on the USB2.0 bus, namely, D+ and D− that are compatible with the USB2.0. When the portable mobile terminal is identified to be connected to a high speed USB3.0 system, data will be transmitted through the D+, the D−, the SSRX−, the SSRX+, the SSTX− and SSTX+ on the USB3.0 bus to realize a high transmission rate, and master work mode and slave work mode of a USB device will be determined through the ID line.

In an example embodiment, the mobile terminal can support two transmission modes—the USB2.0 and the USB3.0. When the micro USB3.0-B interface is determined to adopt USB2.0 standard for transmission, only three data lines—the ID, the D+ and the D− are used, and other wire cables are taken as the MIK lines and the SPK lines for transmitting voice. When the micro USB3.0-B interface is determined to adopt USB3.0 standard for transmission, the ID, the D+, the D−, the SSRX−, the SSRX+, the SSTX− and the SSTX+ are used for transmitting data.

(3) a voice component: the component consists of a processor, an digital analogue signal convertor, a USB shielding wire cable which converts a USB3.0-A interface into a micro USB3.0-B male connector, and a micro USB3.0-B female connector. When the voice component works, four lines—the MicB_SSTX−/Mic_SSTX+, and the MicB_SSRX−/MicB_SSRX+ on the USB 3.0 wire cable are customized as MIC_IN_M/MIC_IN_P, SPK_M/SPK_P lines (the four lines has no sequential order). Voice is transmitted through the four expanded and customized lines. The D+ and D− are used for transmitting a control signal of the voice—AT instruction.

In an example embodiment, a digital voice signal of the component can be pulse code modulation (PCM). The PCM of the digital voice signal is converted into an analogue signal after passing a digital-to-analogue converter. The analogue signal is sent to the connector of the micro USB3.0 through the customized signal lines of the USB3.0. In addition, the control signal of the voice component is received and sent through the AT instruction. The AT instruction is sent to the connector of the micro USB3.0 through the D+ and the D− signals of the micro USB3.0.

It can be seen from the above description that the above embodiments realize the following technical effects (it needs to be explained that these effects are effects that certain preferred embodiments can reach): with the technical solution provided in the embodiments of the disclosure, a micro USB3.0-B female connector interface is designed for a portable mobile terminal so that the portable mobile terminal can realize data and voice communication, thus being able to provide a user with a voice-transmitting function and a data function and particularly suiting wire and wireless terminal products. Applying the technical solution provided in the embodiments of the disclosure to a portable mobile terminal product can make the portable mobile terminal have higher power supply input power, can make the portable mobile terminal have higher transmission rate, can make the portable mobile terminal have a function of transmitting voice, and can make the portable mobile terminal have a function of transmitting data and voice simultaneously.

Obviously, those skilled in the art should recognize that each component or each step of the disclosure can be realized by a general computing device. They can be collected on a single computing device or distributed on network constituted by multiple computing devices. Alternatively, they can be realized by executable program codes of the computing device so that they can be stored in the storage medium and executed by the computing device. In addition, under certain situation, they can be realized by executing the shown or described steps in a sequence different from the sequence herein, or by respectively making them into various integrated circuit components, or by making multiple components or steps among them into a single integrated circuit component. In this way, the disclosure is not limited to any specific combination of software and hardware.

The above is just the example embodiments of the disclosure, and is not intended to limit the disclosure. To those skilled in the art, the disclosure can have various modifications and changes. Any alteration, equivalent replacement, improvement and so on made within the spirit and principle of the disclosure should fall within the scope of protection of the disclosure.

INDUSTRIAL APPLICABILITY

As mentioned above, the method, device and system for voice interaction provided in the embodiments of the disclosure have the following advantageous effects: being able to provide a user with a voice-transmitting function and a data function and particularly suiting wire and wireless terminal products. Applying the technical solution provided in the embodiments of the disclosure to a portable mobile terminal product can make the portable mobile terminal have higher power supply input power, can make the portable mobile terminal have a higher transmission rate, can make the portable mobile terminal have a function of transmitting voice, and can make the portable mobile terminal have a function of transmitting data and voice simultaneously.

What is claimed is:

1. A method for voice interaction, comprising:
   determining that an external device adopts Universal Serial Bus (USB)2.0 standard for transmission and the external device supports a voice function; and
   conducting voice interaction with the external device by adopting customized MIC lines and SPK lines in a micro USB3.0-B female connector interface;
   wherein conducting the voice interaction with the external device by adopting the MIC lines and the SPK lines comprises: conducting the voice interaction with the external device by adopting MIC lines and SPK lines via a USB shielding line which converts a USB3.0-A interface into a micro USB3.0-B male connector interface, wherein after generating a to-be-sent analogue voice signal through a processing of digital-to-analogue conversion, data voice information to be sent to the external device is sent to the external device via the USB shielding line, and/or, after a processing of analogue-to-digital conversion, an analogue voice signal received from the external device via the USB shielding line generates a to-be-received digital voice signal.

2. The method as claimed in claim 1, wherein before conducting the voice interaction with the external device by adopting the MIC lines and the SPK lines, the method further comprises:
   comparing the micro USB3.0-B female connector interface with an USB2.0 interface to determine a first pair of differential signal lines and a second pair of differential signal lines; and
   configuring the first pair of differential signal lines as the MIC lines and configuring the second pair of differential signal lines as the SPK lines.

3. The method as claimed in claim 2, wherein configuring the first pair of differential signal lines as the MIC lines and configuring the second pair of differential signal lines as the SPK lines comprises: configuring a MicB_SSTX− line and a MicB_SSTX+ line among the signal lines of the micro USB3.0-B female connector interface as the MIC lines; and configuring a MicB_SSRX− line and a MicB_SSRX+ line among the signal lines as the SPK lines.

4. The method as claimed in claim 1, wherein the method is applied to a mobile terminal and the external device is an on-board system.

5. A device for voice interaction, comprising:
   a micro USB3.0-B female connector interface, arranged to determine that an external device adopts USB2.0 standard for transmission and the external device supports voice function; and conduct voice interaction with the external device by adopting customized MIC lines and SPK lines;
   wherein the micro USB3.0-B female connector interface is further arranged to conduct the voice interaction with the external device by adopting the MIC lines and the SPK lines via a USB shielding line which converts a USB3.0-A interface into a micro USB3.0-B male connector interface, wherein after generating a to-be-sent analogue voice signal through a processing of digital-to-analogue conversion, data voice information to be sent to the external device is sent to the external device via the USB shielding line, and/or, after a processing of analogue-to-digital conversion, an analogue voice signal received from the external device via the USB shielding line generates a to-be-received digital voice signal.

6. The device as claimed in claim 5, wherein the micro USB3.0-B female connector interface is further arranged to: compare the micro USB3.0-B female connector interface with an USB2.0 interface to determine a first pair of differential signal lines and a second pair of differential signal lines, and configure the first pair of differential signal lines as the MIC lines and configure the second pair of differential signal lines as the SPK lines to conduct the voice interaction with the external device.

7. The device as claimed in claim 6, wherein the micro USB 3.0-B female connector interface 10 is further arranged to configure a MicB_SSTX− line and a MicB_SSTX+ line as the MIC lines, and configure a MicB_SSRX− line and a MicB_SSRX+ line in the wire cable as the SPK lines.

8. A system for voice interaction, comprising the device as claimed in claim 7 and a USB shielding line which converts a USB3.0-A interface into a micro USB3.0-B male connector interface.

9. A system for voice interaction, comprising the device as claimed in claim 6 and a USB shielding line which converts a USB3.0-A interface into a micro USB3.0-B male connector interface.

10. The device as claimed in claim 5, wherein the device is applied to a mobile terminal and the external device is an on-board system.

11. A system for voice interaction, comprising the device as claimed in claim 5 and a USB shielding line which converts a USB3.0-A interface into a micro USB3.0-B male connector interface.

* * * * *